Nov. 28, 1933.　　　　　G. MOE　　　　　1,937,433
METHOD AND APPARATUS FOR MAKING PHOTOGRAPHIC MEASUREMENTS
Filed March 24, 1930　　4 Sheets-Sheet 1

Inventor
Gerhard Moe
By Wilson, Dowell, McCanna & Rehm
Attys.

Nov. 28, 1933.  G. MOE  1,937,433
METHOD AND APPARATUS FOR MAKING PHOTOGRAPHIC MEASUREMENTS
Filed March 24, 1930   4 Sheets-Sheet 2
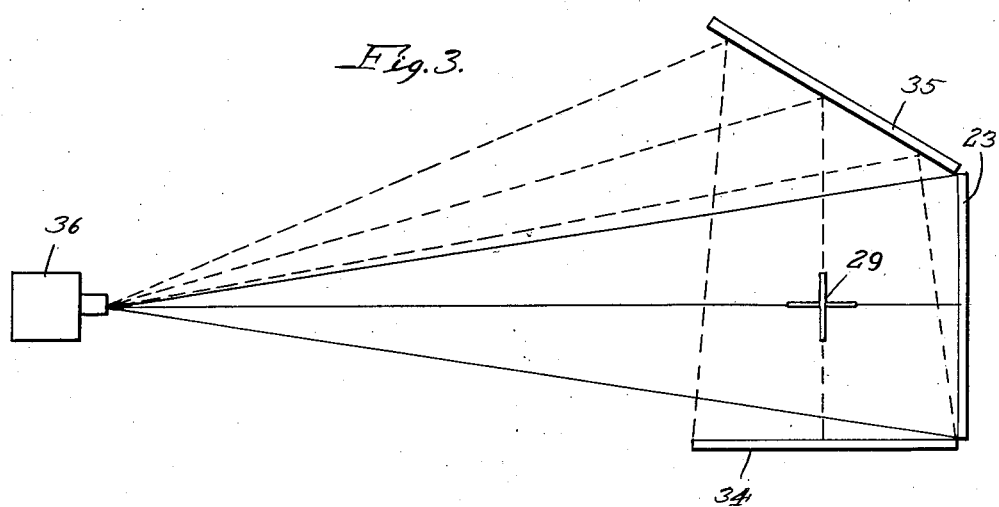
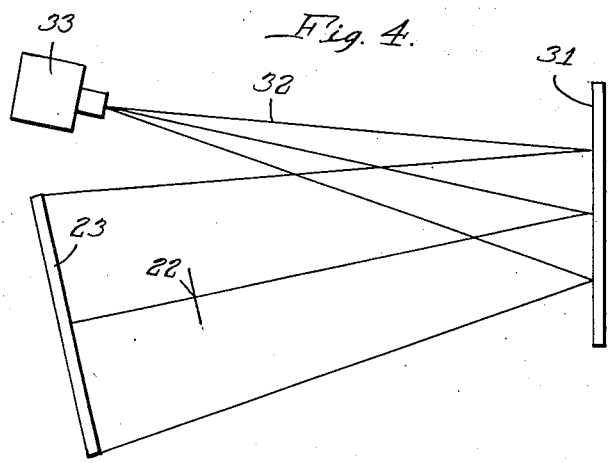
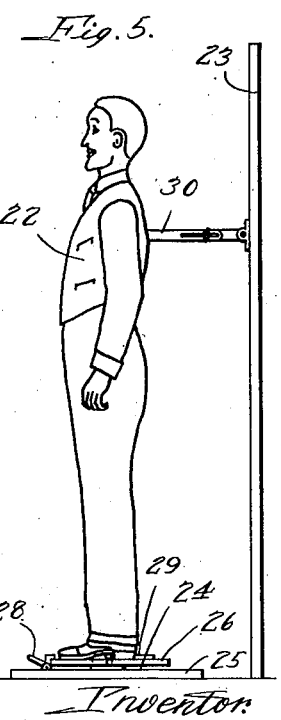
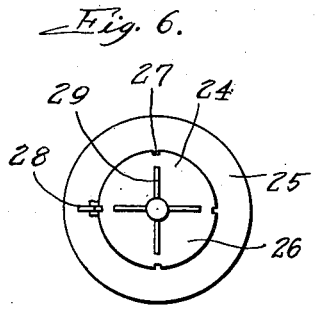

Nov. 28, 1933. G. MOE 1,937,433
METHOD AND APPARATUS FOR MAKING PHOTOGRAPHIC MEASUREMENTS
Filed March 24, 1930 4 Sheets-Sheet 3
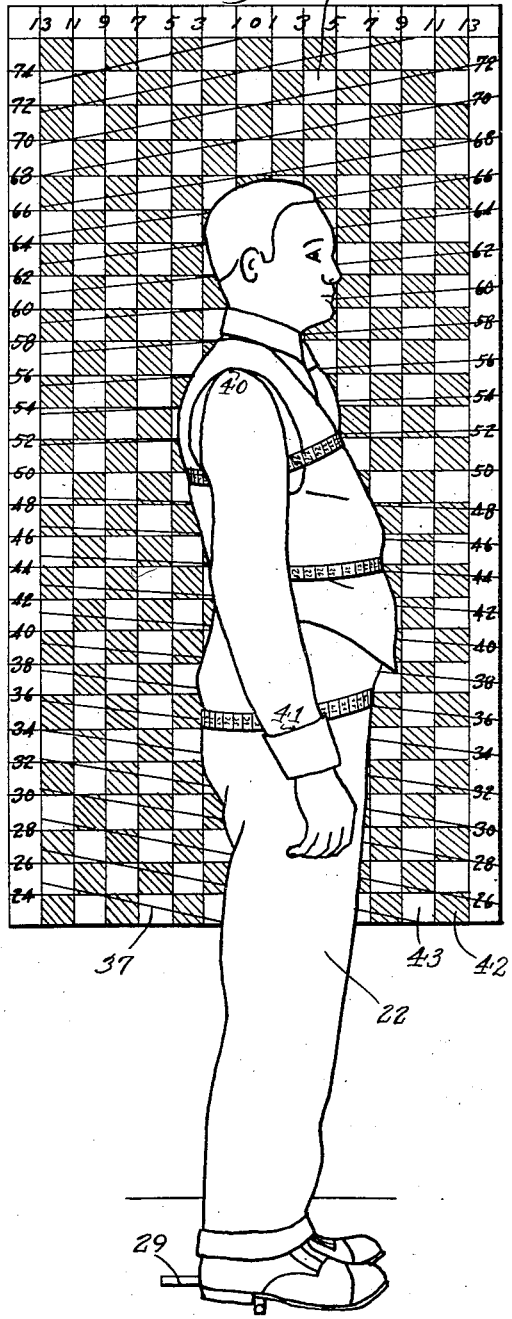
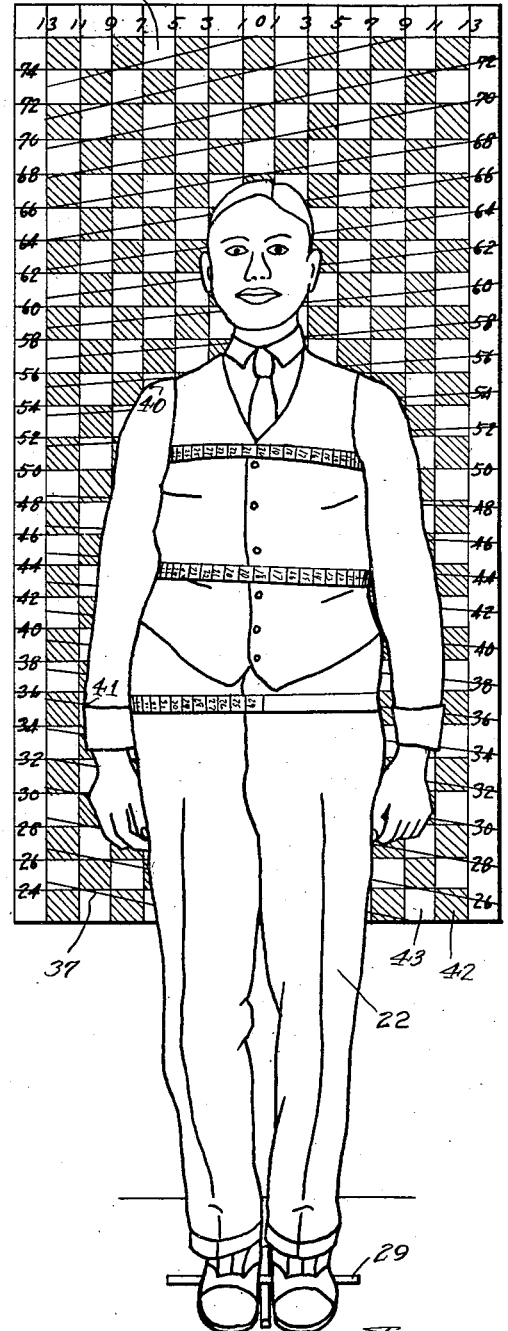

Nov. 28, 1933.  G. MOE  1,937,433
METHOD AND APPARATUS FOR MAKING PHOTOGRAPHIC MEASUREMENTS
Filed March 24, 1930  4 Sheets-Sheet 4
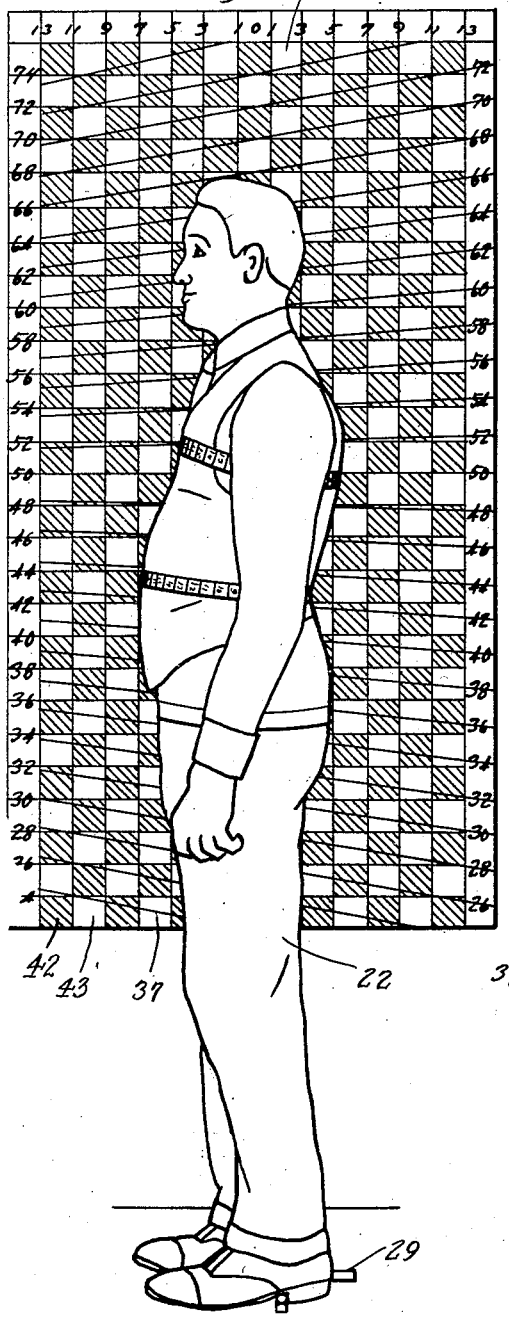
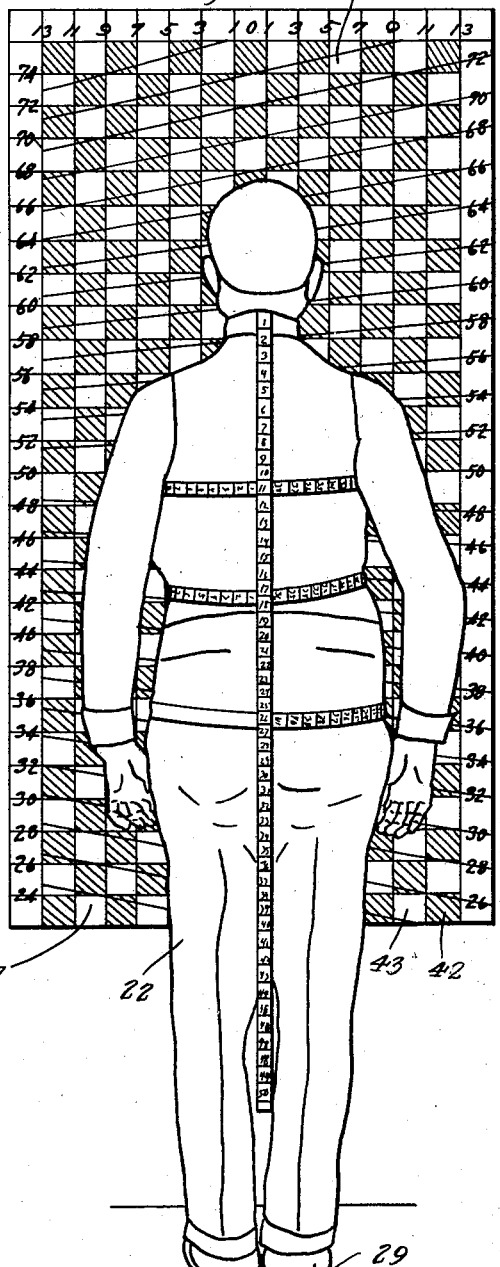

Patented Nov. 28, 1933

1,937,433

UNITED STATES PATENT OFFICE 1,937,433

METHOD AND APPARATUS FOR MAKING PHOTOGRAPHIC MEASUREMENTS

Gerhard Moe, Rockford, Ill.

Application March 24, 1930. Serial No. 438,281

7 Claims. (Cl. 33—17)

My invention relates to photographic measurements and has special reference to an improved method and improved apparatus for taking photographic measurements.

The value of photographs for measuring purposes has been limited, in the past, because measurements may be made thereon only in a single plane. There has been no means for making what has been termed perspective measurements, that is, measurements in more than one plane. Photographs have been made by placing objects before a graduated background as taught in my prior Patents No. 1,414,481, dated May 2, 1922, and 1,418,602, dated June 6, 1922, whereby distances on the object might be determined with a fair degree of accuracy by comparison against the background which was so graduated as to represent distance in a plane through the object parallel to the background.

However, these graduations can represent but a single plane through the object at a predetermined distance from the background. This method is satisfactory when all of the object lies in substantially a single plane, and measurements are to be made in that plane. But, when the object to be photographed is thick, and extends a considerable distance forward and rear of this plane, those parts of the object nearer to the camera than this plane will appear against the background as larger than their true size, in proportion to their distance from the plane, and those further from the camera than this plane will appear relatively smaller. No means on the chart has heretofore been known for determining from the background, distances without this plane for making measurements of objects forward or rear of this reference plane extending through the body.

I have, therefore, aimed to provide a method of making photographic measurements whereby any desired measurement may be had from a predetermined number of photographs.

A still further object of the invention is to provide a photographic measuring chart against which an object is adapted to be photographed for the purpose of making photographic measurements.

A further object of the invention is the provision of improved methods for making photographic measurements.

Another object of the invention is the provision of improved means for positioning a body before a photographic measuring chart for the purpose of making a plurality of photographs.

Other objects and attendant advantages will become apparent to those skilled in the art from the following description and the accompanying drawings in which—

Fig. 3 shows a manner of photographing in which two views of the same object may be obtained upon a single exposure;

Fig. 4 shows a manner in which a desired photograph may be taken when the space available is less than the photographic distance;

Fig. 5 shows a manner in which the object is positioned before the chart, and a suitable form of brace;

Fig. 6 shows a turntable adapted to be used for turning the object for the making of a desired series of photographs; and Figs. 7, 8, 9 and 10 show the various views of the object against my improved photographic measuring background, obtained as shown in Fig. 2.

Figure 1:
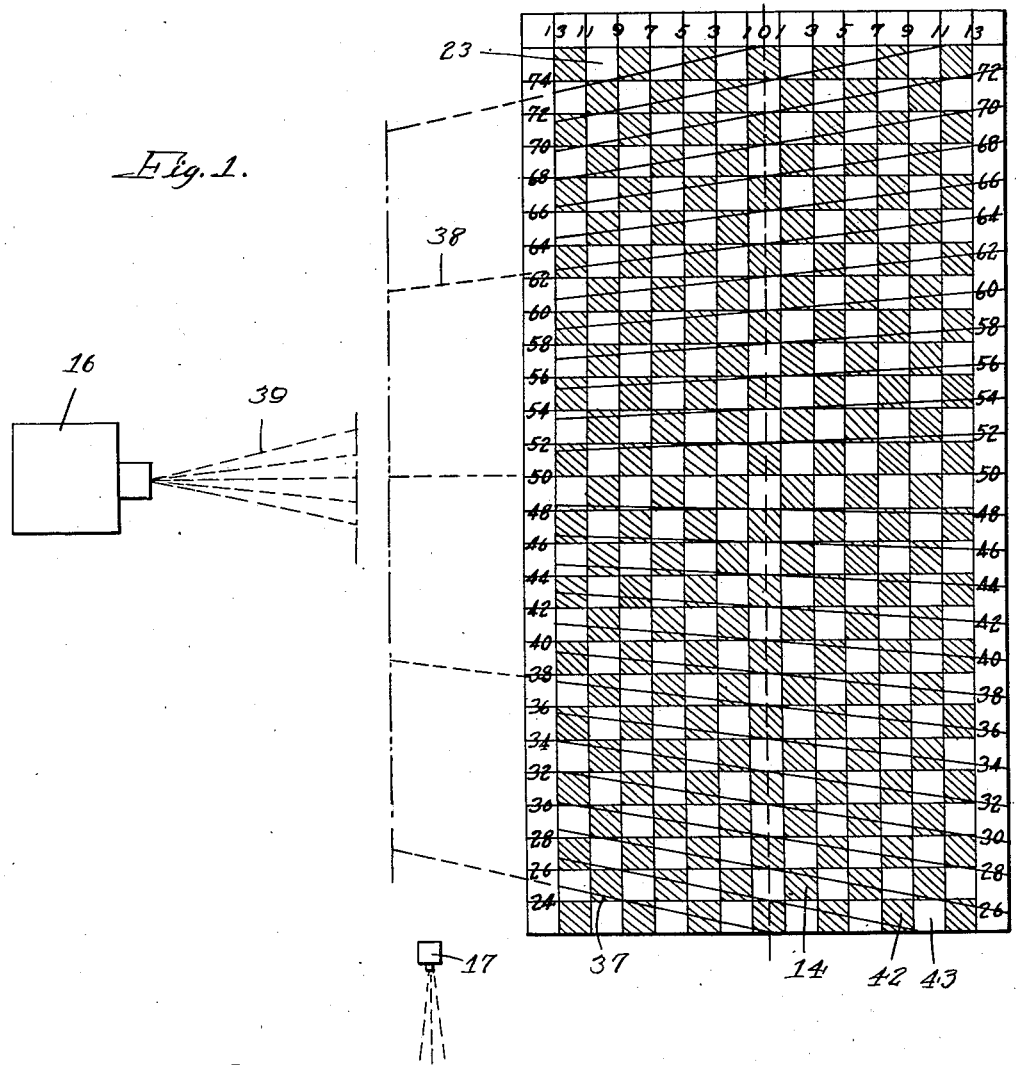
Figure 1 shows the manner in which the prespective lines are developed upon the background.
Figure 2:
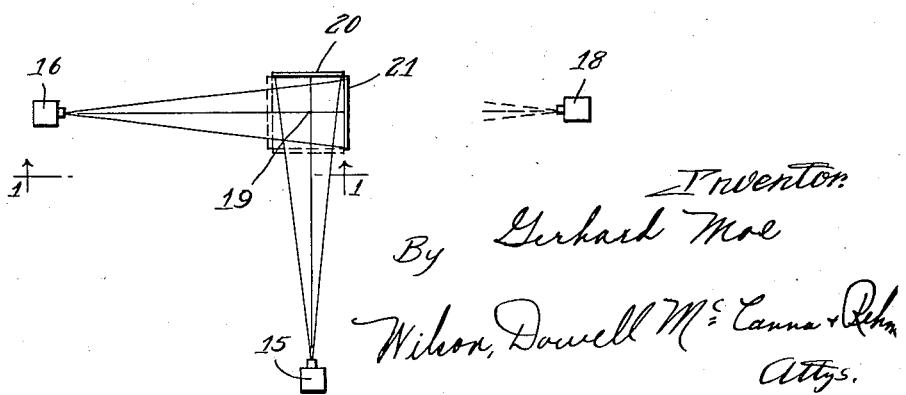
Fig. 2 shows in diagrammatic form one manner in which the photograph may be taken.

Referring first to Figs. 1 and 2 I have provided a background, indicated generally by the numeral 14, which is divided into squares by lines running vertically and horizontally on the surface thereof in accordance with the aforementioned Patent No. 1,414,481. The distance between any two of the lines is such as to represent units of distance, as indicated by the numerals at the left side and top of the chart, in a plane through the object, which is located a predetermined distance in front of the background. The actual distance between these lines on the background will, of course, depend upon the distance between the camera and the background and between the object and the background. These distances may be varied as desired, a corresponding change being made in the actual distance between the lines on the background, but in this instance and throughout this specification I shall deal with examples wherein the distance between the camera and the background is 11 feet and the distance between the center of the object and the background is 15 inches. Under these conditions the distance between the horizontal and vertical lines represents two inches in a plane 15 inches from the background, which plane I shall hereafter refer to as the "reference plane".

Referring now to Fig. 2, four cameras, designated 15, 16, 17 and 18 are shown arranged to photograph an object positioned with its center substantially on the vertical axis 19, against the backgrounds 20 and 21 positioned at right angles with respect to each other. Two photographs may be made simultaneously, one with camera 15 and one with camera 16 at right angles to each other. The screens 20 and 21 may then be moved to the dotted line position shown and simultaneous photographs taken with cameras 17 and 18 showing the other two right angled views of the object. Views taken in this manner, with the object in a single posture, are shown in Figs. 7-10, inclusive. Obviously, similar views may be obtained by employing a single background and a single camera and rotating the object taking successive views with the same camera at right angles to each other. However, it is often desirable to obtain all of the views without moving the object. For example, in photographing the human form as for identification many small changes may occur in the photographs due to the change in posture of the object if moved between photographs. Therefore, if two simultaneous views are taken at right angles to each other, the various correlative measurements may be had from the object in identical postures, as will presently appear from the description. The same is true of photographs for tailoring purposes or those of animals and the like. Fig. 5 shows apparatus arranged to permit the various views to be made by turning the object. I have here shown the figure of a person 22, positioned before a background 23 upon a turntable, designated generally by 24, a top view of which is shown in Fig. 6. The turntable has a base 25 upon which is positioned a rotatable table 26 having a plurality of notches 27 at the edge thereof at 90° from each other on the circumference of the table 26. A latch 28 attached to the frame 25, is adapted to be foot operated and to engage the slots 27 to hold the turntable alternately in any one of the four positions. A positioning device 29, such for example as that shown in my prior Patent No. 1,418,662, is located on the top of the table 26 to provide a convenient method for locating the object 22. It will be seen that where other objects, such as furniture or the like, are to be photographed other types of positioning devices may be employed on the turntable to suitably locate the object. The turntable is so located that the center of rotation of the table lies on the vertical axis 19 shown in Fig. 2, that is, directly in front of the center line of the background 23 and in the reference plane. The object may first be photographed in the position shown in Fig. 5. The latch 28 may then be depressed and the object rotated 90° when the latch 28 will fall into the next succeeding slot 27. This may be done with a minimum disturbance to the posture of the subject. A second photograph may be taken in this position and the rotation continued until four photographs have been taken. For most purposes it will be found that three photographs are sufficient, two sides of the object being so nearly identical as to require but a single view.

When living objects, such as people, are to be photographed it is often advantageous to provide a brace or braces 30 from the background to the object in order center the object and insure the proper spacing thereof from the background. These braces may be so arranged as to support or have upon their surface suitable scales indicating distances between desired points on the object.

I have shown in Fig. 4 a convenient method for making photographs when all are to be made with a single camera on a single background. Here the object 22 is placed before the background 23, as previously described. A mirror 31 is positioned to reflect the image back to a point adjacent to the screen, as shown by the projection lines 32, to a camera 33 so as to reflect the image of the object 22 against the screen 23 into the camera. In this case the total distance from camera to mirror and mirror to background must be the same as before or 11 feet. This permits the operator to stand near the object during the operations and also reduces the amount of space required for taking the photographs. While a distance of at least 12 feet would be normally required, this method of procedure permits the photographs to be taken between walls but little more than six feet apart.

Fig. 3 shows another method in which two photographs may be taken simultaneously with the same camera exposure. Here a second screen 34 is positioned with respect to the first screen 23 to reflect the light incidental on the surface thereof to a mirror 35, the object 22 being positioned as before. This will result in a photograph having the object against the screen 23 in the usual manner and a second view showing the object as reflected from the mirror 35. With this arrangement the view reflected from the mirror 35 will be upon a different scale due to the difference in the distance between the screen 34 and the camera 36. This portion of the photograph may, however, be enlarged to a suitable size to be capable of use in conjunction with the photograph made against the background 23 in a manner hereinafter to be described.

Referring to Fig. 2, suppose now that when the photograph of camera 15 was taken, the rays of light reflected from the vertical center line of screen 21 and passing through points spaced at two inch intervals on the vertical axis 19, were visible, and were photographed against the background 20. This condition is represented in Fig. 1, the diagonally spaced lines 37 representing these rays photographed on the background 20 and converging to the lens of camera 16, as shown in dotted lines 38 and 39. Since the distance between the diagonal lines is, by hypothesis, two inches on the vertical axis 19, and since the horizontal lines on the background 14 are made to represent two inch distances in a plane parallel to the background 14 through the axis 19, the horizontal and diagonal lines will coincide at the vertical center line of the background, indicated by 0, in the top scale of the background. The distances between the diagonal lines 37 on either side of this center line will represent proportional distances at the distance indicated at the top of the background forward or rear of the reference plane, as the case may be, distances on the right of the center line, facing the figures, representing distances in front of the reference plane and those on the left distances to the rear of the reference plane. By measuring off on the diagonal lines the distance on the object desired to be reduced to the reference plane on the vertical line representing the plane in which the desired distance lies, either in front or behind the reference plane, as represented by the figures along the top of the chart, and following along the diagonal lines to the center line, the true distance may be obtained by reading the scale on the right of the chart. This graphic arrangement I have termed a perspective measuring means. The figures on the vertical scales on either side of the chart also represent the distance from the floor at the reference plane, as, for example, the height of the object in Fig. 7 is 67¾ inches.

To illustrate, let us obtain the true distance between the points 40 and 41 in Fig. 7. One end of a pair of dividers may be placed on each of the points 40 and 41. If the dividers are then placed against the scale on the left side of the background, the distance will be seen to be 22 inches. However, this scale represents distances in a plane 15 inches from the background, while the line joining the points 40 and 41 is some distance nearer the camera and will consequently appear on this scale as larger than its true value. Referring to Fig. 8, which is a photograph taken at right angles to the object in Fig. 7, we find that since the reference plane passes through the center of the object, the point 40 lies in a plane 7 inches nearer the camera than the reference plane, as shown by the numerals at the top of Fig. 8. The point 41, in like manner, lies in a plane substantially 11 inches nearer than the reference plane, as shown by the vertical lines and the figures at the top of the background. To obtain the distance between the points we lay the distance off between any of the diagonal or perspective lines at the right of the center line of the background, one leg of the dividers being on the 7 inch line and one on the 11 inch line. If we follow these lines to the vertical center line 0 or read the distance on the scale at the right side of the background, we will find the true distance between the points 40 and 41, which will be seen to be 20¾ inches instead of 22 inches, as it appeared against the background. If the distance to be measured lies between the background and the reference plane, the distance is laid off between the diagonal lines to the left of the center line of the background and the readings are made on the scale at the right, as previously described.

It should be observed that the background is provided with two separate measuring devices. When measurements are being made in the reference plane the squares are employed and readings are made on the top and left scales, as clearly set forth in the above mentioned prior Patent No. 1,414,481. When measurements are being made in planes other than the reference plane two photographs, taken at right angles to each other, are employed, the diagonal lines are used, and readings are made on the top and right scales in the manner illustrated. The diagonal lines thus serve as a convenient manner of determining actual distances from the apparent distance as photographed by referring these distances to the reference plane.

In preparing the background I proceed, as indicated in my prior Patent No. 1,414,481, except that instead of forming squares as indicated therein by intersecting lines, I produce alternate squares 42 and 43 of different colors. I have found this to be highly effective in the photographing of many objects, such as colored objects whereby the colors of the squares may be so chosen as to clearly contrast with the object to produce a sharp outline. The use of blocks of solid color also permits more accurate measurements to be made since it eliminates the error due to the thickness of the lines.

I have found that for the distances already stated between the camera, object, and background it is necessary that the horizontal and vertical lines on the background be one eighth greater in order to represent one inch distances in the reference plane. Thus, the true distances between the horizontal lines, with which the scale on the left corresponds, is 2¼ inches instead of 2 inches, as indicated in the scale and the same is true for the vertical lines, as indicated in the scale at the top of the background.

In placing the diagonal or perspective lines upon the background I have found it convenient to proceed as follows: Beginning at the level of the lens, which is the horizontal line numbered 50, at a distance to the left of the vertical center line equal to the distance between the background and the reference plane, in this instance 15 inches, mark off two inch intervals. Connect these points successively with successive intersections between the vertical center line and the horizontal lines, beginning at line 50 and proceeding up and down, extending the lines completely across the background, as shown in Figs. 7–10, inclusive. These lines will then represent the hypothetical reflected rays between the camera 16 and the background 21, photographed on the background 20, as previously discussed. Obviously, other methods may be employed to produce these lines with the proper degree of angularity if desired.

The advantages of my improved method and apparatus for making photographic measurements should be apparent from the description. The distances between points on the body of the object outside the reference plane may be determined by simple and direct means. It will be seen that by taking four separate and distinct photographs, as shown in Figs. 7–10, inclusive, the distances between any two points on the body may be found.

The relative distances between the camera, the object and the background, and consequently the distances between the lines on the scale, will depend on the size of the object to be measured to a great extent. For example, machinery, furniture, etc., may require a greater focal distance, while for measuring the human body I have found the distances heretofore set forth employing a background about 7 feet high to be satisfactory. For measuring animals and other natural products I have found larger backgrounds to be desirable in many instances.

It will be seen that by making four photographs similar to Figs. 7–10, inclusive, a complete set of bodily measurements are obtained for tailoring purposes and other purposes. The exact measurements may be made from these photographs at any time, for example, years after the photographs are actually taken, and may be checked with present measurements of the individual or machine, as the case may be.

While I have thus described and illustrated the specific embodiment of my invention the numerous alterations and changes may be made therein without departing from the spirit of the invention and I do not wish to be limited except as required by the scope of the prior art and the scope of the appended claims, in which I claim:

1. In a photographic measuring apparatus, a background having rectangular blocks of alternately different colors arranged thereon to indicate distances from the floor and distances laterally in a reference plane parallel to said background at a predetermined distance in front thereof, scales thereon having indicating numerically vertical and horizontal distances in said reference plane, a plurality of spaced diagonal lines thereon to indicate distance in planes other than said reference plane, and a numerical scale arranged to cooperate with said diagonal lines to translate distances in other planes to distances in said reference plane.

2. In a photographic measuring apparatus, a background having rectangular blocks of contrasting colors arranged thereon to indicate distances on a reference plane parallel to said background at a predetermined distance therefrom, and diagonal lines sloped to indicate distances in planes other than said reference plane.

3. A background before which an object is adapted to be photographed for measurement, having a plurality of rectangles of alternately different colors thereon for indicating differences in a reference plane through the object and parallel to the background, and graphic devices thereon constituting a plurality of lines representing radii from the photographic devices to the background, for indicating distances in planes other than said reference plane.

4. In a photographic measuring apparatus, a background adapted to be photographed by a camera, said background having rectangular blocks of contrasting colors arranged thereon to indicate distances in a reference plane parallel to said background at a predetermined distance therefrom, and a plurality of diagonal lines sloped to converge at a point equi-distant with said camera from a vertical plane through said background.

5. In a photographic measuring apparatus, a background before which an object is adapted to be photographed, said background having spaced horizontal and vertical lines to indicate distances on a reference plane through said object, and converging diagonal lines spaced at some vertical plane on said background a distance equal to the distance between said horizontal lines, said diagonal lines being sloped to converge a distance from said vertical plane equal to the distance of said camera from said background.

6. In a photographic measuring apparatus, a background before which an object is adapted to be photographed, said background having a plurality of horizontal and vertical lines to indicate distances on a reference plane through said object, and converging lines spaced at the center of said background a distance equal to the distance between said horizontal lines, said converging lines being sloped to converge on the horizontal center line of said background a distance from the vertical center line equal to the distance of said camera from said background.

7. The method of making photographic measurements comprising, positioning an object to be measured before a background having measuring means for indicating distances in a reference plane, making at least two photographs of said object against said background at right angles with respect to each other, determining from one photograph the distance of parts of the object from the reference plane, increasing or decreasing the size of the part of the object lying out of the reference plane in an amount depending upon the ratio between the distances from the camera to that part of the object and from the camera to the reference plane.

GERHARD MOE.